United States Patent
Jeong et al.

(10) Patent No.: US 10,632,959 B2
(45) Date of Patent: Apr. 28, 2020

(54) AIRBAG APPARATUS

(71) Applicant: HYUNDAI MOBIS CO., LTD., Seoul (KR)

(72) Inventors: Ga Ram Jeong, Yongin-si (KR); Hae Kwon Park, Yongin-si (KR); Rae Ick Jang, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 138 days.

(21) Appl. No.: 15/964,162

(22) Filed: Apr. 27, 2018

(65) Prior Publication Data

US 2018/0312131 A1    Nov. 1, 2018

(30) Foreign Application Priority Data

Apr. 27, 2017   (KR) .................. 10-2017-0054405

(51) Int. Cl.
| | |
|---|---|
| *B60R 21/2338* | (2011.01) |
| *B60R 21/233* | (2006.01) |
| *B60R 21/26* | (2011.01) |
| *B60R 21/00* | (2006.01) |
| *B60R 21/239* | (2006.01) |

(52) U.S. Cl.
CPC ........ *B60R 21/2338* (2013.01); *B60R 21/233* (2013.01); *B60R 21/26* (2013.01); *B60R 2021/0004* (2013.01); *B60R 2021/0009* (2013.01); *B60R 2021/0048* (2013.01); *B60R 2021/2395* (2013.01); *B60R 2021/23308* (2013.01); *B60R 2021/23382* (2013.01); *B60R 2021/23384* (2013.01); *B60R 2021/23386* (2013.01); *B60R 2021/26094* (2013.01)

(58) Field of Classification Search
CPC .............. B60R 21/2338; B60R 21/233; B60R 2021/2395
See application file for complete search history.

(56) References Cited

U.S. PATENT DOCUMENTS

| | | | | |
|---|---|---|---|---|
| 8,678,429 | B2 * | 3/2014 | Nagasawa | B60R 21/233 280/729 |
| 9,650,011 | B1 * | 5/2017 | Belwafa | B60R 21/233 |
| 10,391,964 | B2 * | 8/2019 | Nagasawa | B60R 21/231 |
| 2008/0036188 | A1 * | 2/2008 | Gould | B60R 21/2338 280/739 |

(Continued)

*Primary Examiner* — James A English
(74) *Attorney, Agent, or Firm* — H.C. Park & Associates, PLC

(57) ABSTRACT

An airbag apparatus including: a first chamber connected to an inflator; a second chamber connected to the rear of the first chamber and supported by the first chamber, supporting the head of a passenger in case of an oblique collision of a vehicle, and having a first passage through which gas of the first chamber is introduced; a third chamber connected to the rear of the first chamber and supported by the first chamber, disposed at one side of the second chamber, and supporting the head of the passenger in a head-on collision of the vehicle; a connection tether connecting the second and third chambers to limit separation between the second and third chambers; and a shut-off valve closing the first passage to block gas of the second chamber from being discharged to the first chamber through the first passage, when the first chamber is completely deployed.

9 Claims, 10 Drawing Sheets

(56) References Cited

U.S. PATENT DOCUMENTS

| | | | |
|---|---|---|---|
| 2011/0309605 A1* | 12/2011 | Kumagai | B60R 21/2338 |
| | | | 280/741 |
| 2016/0311392 A1* | 10/2016 | Jindal | B60R 21/231 |
| 2018/0111581 A1* | 4/2018 | Wang | B60R 21/231 |
| 2018/0297548 A1* | 10/2018 | Abramoski | B60R 21/231 |

* cited by examiner

AIRBAG APPARATUS

CROSS-REFERENCES TO RELATED APPLICATION

This application claims priority from and the benefit of Korean Patent Application No. 10-2017-0054405, filed on Apr. 27, 2017, which is hereby incorporated by reference for all purposes as if set forth herein.

BACKGROUND

Field

Exemplary embodiments relate to an airbag apparatus, and more particularly, to an airbag apparatus capable of protecting the head of a passenger in case of an oblique collision or head-on collision of a vehicle.

Discussion of the Background

In general, a vehicle has an airbag installed to protect a passenger. The airbag is disposed at various positions depending on a passenger's body parts which need to be protected. A steering wheel includes a driver airbag to protect the head of a driver, and a passenger airbag is installed at the front of the vehicle so as to protect the head of a passenger seated beside the driver.

In case of an oblique collision or head-on collision, an electronic control module decides whether to explode a detonator of an inflator. When gas is generated from the inflator, an airbag cushion is expanded by the generated gas.

As the vehicle regulations for passenger protection are tightened, the size of the airbag cushion is increased. Furthermore, in order to rapidly deploy the airbag cushion of which the size is increased, two inflators are connected to the airbag cushion.

However, when the size of the airbag cushion is increased, the expansion time of the airbag cushion increased. Therefore, in case of an oblique collision of the vehicle, a time required for holding the head is delayed. When the time required for the airbag cushion to hold the head is delayed, the head or neck may be injured while the head is turned.

Furthermore, when the size of the airbag cushion and the installation number of inflators are increased, the manufacturing cost of the vehicle inevitably rises.

Therefore, there is a demand for a structure capable of solving the problem.

The above information disclosed in this Background section is only for enhancement of understanding of the background of the invention and, therefore, it may contain information that does not constitute prior art.

SUMMARY

Exemplary embodiments of the present invention provide an airbag apparatus capable of protecting the head of a passenger in case of an oblique collision or head-on collision of a vehicle.

Additional features of the invention will be set forth in the description which follows, and in part will be apparent from the description, or may be learned by practice of the invention.

An exemplary embodiment of the present invention discloses an airbag apparatus may including: a first chamber connected to an inflator; a second chamber connected to the rear of the first chamber so as to be supported by the first chamber, supporting the head of a passenger in case of an oblique collision of a vehicle, and having a first passage through which gas of the first chamber is introduced; a third chamber connected to the rear of the first chamber so as to be supported by the first chamber, disposed at one side of the second chamber, and supporting the head of the passenger in case of a head-on collision of the vehicle; a connection tether connecting the second and third chambers to limit a separation between the second and third chambers; and a shut-off valve configured to close the first passage to block gas of the second chamber from being discharged to the first chamber through the first passage, when the first chamber is completely deployed.

Another exemplary embodiment of the present invention discloses the shut-off valve may including: a valve tether fixed to the first chamber, and passing through the first passage; and a valve cover connected to the valve tether, and pulled by the valve tether so as to close the first passage when the first chamber is completely deployed.

When the first chamber is completely deployed, the valve tether may be disposed in parallel to the front-to-rear direction of the vehicle in the first passage.

A part of the edge of the valve cover may be fixed to the circumference of the first passage by a valve sewing part.

The third chamber may have a larger widthwise length than the second chamber.

The third chamber may be formed to the same height as the second chamber.

The connection tether may be disposed at the rear of the second chamber and the rear of the third chamber.

The connection tether may include a surface tether which covers a part of one surface of the second chamber at the rear thereof and a part of one surface of the third chamber at the rear thereof.

One side of the surface tether may be connected to the second chamber by a first sewed part, and the other side of the surface tether may be connected to the third chamber by a second sewed part. The first sewed part may be positioned eccentrically toward the third chamber based on the center of the second chamber, and the second sewed part may be positioned eccentrically away from the second chamber based on the center of the third chamber.

The connection tether may include one or more linear tethers for connecting the second chamber and the third chamber.

One side of the linear tether may be connected to the second chamber by a first sewed part, and the other side of the linear tether may be connected to the third chamber by a second sewed part. The first sewed part may be positioned eccentrically eccentrically toward the third chamber based on the center of the second chamber, and the second sewed part may be positioned eccentrically away from the second chamber based on the center of the third chamber.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
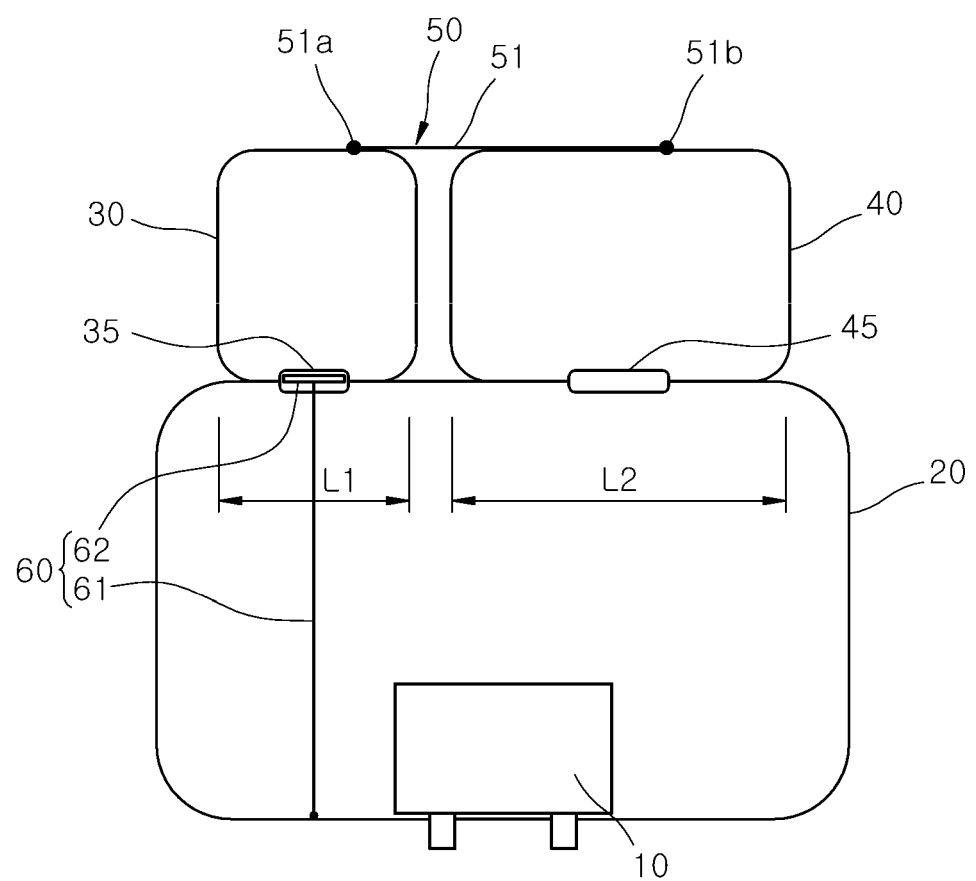
FIG. 1 is a plan view illustrating an airbag apparatus in accordance with an embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereinafter, exemplary embodiments of the present invention will be described in more detail with reference to the accompanying drawings.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. The regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
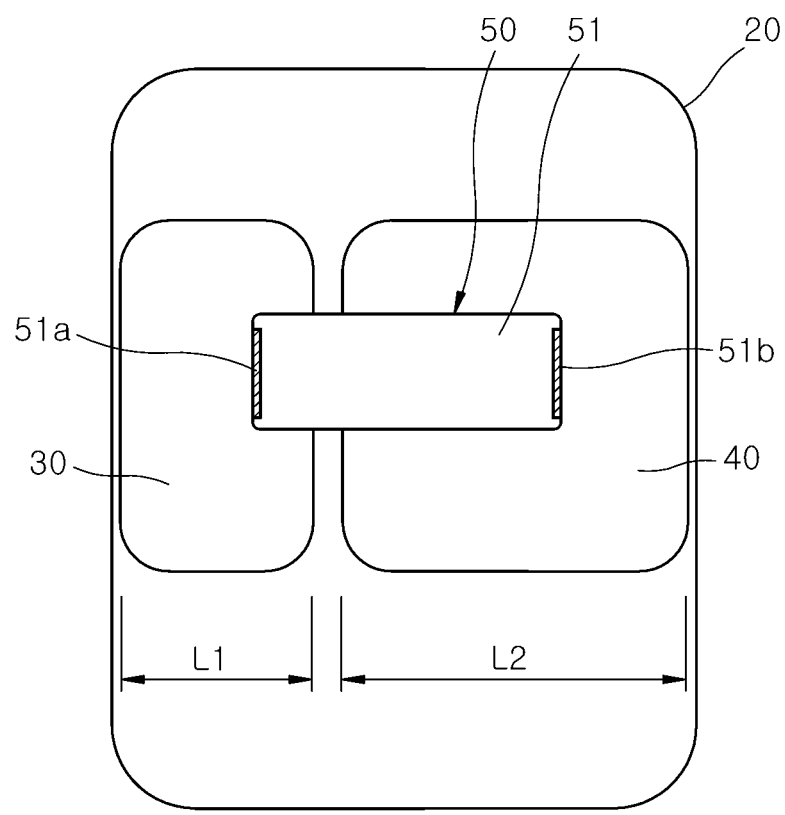
FIG. 2 is a rear view illustrating an example of a connection tether in the airbag apparatus in accordance with the embodiment of the present invention.

FIG. 1 is a plan view illustrating an airbag apparatus in accordance with an embodiment of the present invention, and FIG. 2 is a rear view illustrating an example of a connection tether in the airbag apparatus in accordance with an exemplary embodiment of the present invention.

Referring to FIGS. 1 and 2, the airbag apparatus in accordance with the embodiment of the present invention may include a first chamber 20, a second chamber 30, a third chamber 40, a connection tether 50 and a shut-off valve 60.

The first chamber 20 may be connected to an inflator 10. When the first chamber 20 is completely deployed, the first chamber 20 may have a rectangular box shape. The first chamber 20 is supported by an instrument panel (not illustrated) at the front of the inside of a vehicle.

The second chamber 30 may be connected to the rear of the first chamber 20 so as to be supported by the first chamber 20, and support the head H of a passenger (refer to FIG. 5) in case of an oblique collision of the vehicle. The second chamber 30 may have a first passage 35 through which gas of the first chamber 20 is introduced. When the second chamber 30 is completely expanded, the second chamber 30 may have a rectangular box shape.

The third chamber 40 may be connected to the rear of the first chamber 20 so as to be supported by the first chamber 20, and disposed at one side of the second chamber 30. In case of a head-on collision of the vehicle, the third chamber 40 may support the head H of the passenger. The third chamber 40 may have a second passage 45 through which the gas of the first chamber 20 is introduced. The third chamber 40 may be disposed in parallel to the second chamber 30 at the rear of the first chamber 20. When the third chamber 40 is completely expanded, the third chamber 40 may have a rectangular box shape.

The airbag apparatus in accordance with the embodiment of the present invention is formed in such a manner that the first to third chambers 20 to 40 are distinguished from each other, and deploy the first to third chambers 20 to 40 using one inflator 10. Therefore, the size of the airbag apparatus and the installation number of the inflator 10 can be reduced, which makes it possible to reduce the manufacturing cost of the vehicle.

The connection tether 50 may connect the second and third chambers 30 and 40 in order to restrict a separation of the second chamber 30 from the third chamber 40. When the second and third chambers 30 and 40 are deployed, the connection tether 50 may limit the distance between the second and third chambers 30 and 40.

Therefore, in case of an oblique collision of the vehicle, the connection tether 50, the second chamber 30 and the first chamber 20 may be transformed in a stepwise manner while absorbing the load of the head H. At this time, since the head H is inserted and held between the third and third chambers 30 and 40, a turn of the head H can be prevented by the holding forces of the second and third chambers 30 and 40, and a time required for holding the head H can be shortened. Since a turn of the head H is prevented in case of an oblique collision of the vehicle, an injury of the head H or neck can be prevented. Furthermore, when the head H is moved obliquely in the direction of the oblique collision of the vehicle, the connection tether 50 may pull the second chamber 30 toward the third chamber 40 using a support force (reaction force) of the third chamber 40. Therefore, the connection tether 50 can prevent the head H from being away from the second chamber 30. Thus, although the sizes of the first to third chambers 20 to 40 are not increased, the head H can be protected.

When the head H applies a load to the connection tether 50 and the third chamber 40 in case of a head-on collision of the vehicle, the connection tether 50, the third chamber 40 and the first chamber 20 may absorb the shock of the head H in a stepwise manner. At this time, when the third chamber 40 is contracted forward by the load of the head H, the reaction forces of the second and third chambers 30 and 40 may pull the connection tether 50 from both sides. Therefore, the load of the head H may be buffered by the tensile force of the connection tether 50, the reaction force of the second chamber 30 and the reaction force of the third chamber 40.

The widthwise length L2 of the third chamber 40 may be larger than the widthwise length L1 of the second chamber 30. At this time, the widthwise length L1 of the second chamber 30 may be larger than a half of the widthwise length L2 of the third chamber 40. The widthwise lengths L1 and L2 of the second and third chambers 30 and 40 can be appropriately changed in consideration of the size of the vehicle and the widthwise length of the airbag apparatus.

Since the third chamber 40 is disposed in front of the head H of the passenger, the head H may pressurize the third chamber 40 while being moved toward the front of the vehicle, in case of a head-on collision of the vehicle. Therefore, the head H may be prevented from being stuck between the second and third chambers 30 and 40 in case of a head-on collision of the vehicle.

The third chamber 40 may be formed at the same height as the second chamber 30. Since the second and third chambers 30 and 40 are formed at the same height, the reaction forces of the second and third chambers 30 and 40 may act to pull the connection tether 50 from both sides, even though the head H pressurizes any one of the second and third chambers 30 and 40. Therefore, the load of the head H may be primarily absorbed by the tensile force of the connection tether 50, secondarily absorbed by the second chamber 30 or the third chamber 40, and finally absorbed by the first chamber 20.

The connection tether 50 may be disposed at the rears of the second and third chambers 30 and 40 such that the head H comes in contact with the connection tether 50. Therefore, when the head H collides with the second or third chamber 30 or 40, the connection tether 50 can primarily buffer the load of the head H.

The connection tether 50 may include a surface tether 51 which covers a part of one surface of the second chamber 30 at the rear thereof and a part of one surface of the third chamber 40 at the rear thereof. The surface tether 51 may have a width ranging from ⅓ to ⅔ of the height of the second or third chamber 30 or 40. The surface tether 51 may indicate a rectangular or elliptical tether of which the width is smaller than the length. When the connection tether 50 is the surface tether 51, a contact area between a collision part of the head H and the surface tether 51 may be widened, which makes it possible to prevent a concentration of pressure on a specific part of the head H. Therefore, the airbag apparatus can prevent the head H from being injured by the connection tether 50.

One side of the surface tether 51 may be connected to the second chamber 30 by a first sewed part 51a, and the other side of the surface tether 51 may be connected to the third chamber 40 by a second sewed part 51b. The first sewed part 51a may be positioned eccentrically toward the third chamber 40 based on the center of the second chamber 30, and the second sewed part 51b may be positioned eccentrically away from the second chamber 30 based on the center of the third chamber 40. Since the other side of the surface tether 51 is positioned eccentrically away from the second chamber 30 based on the center of the third chamber 40, the support force of the third chamber 40 to support the surface tether 51 can be increased when the second or third chamber 30 or 40 is pressurized by the head H.

Figure 3:
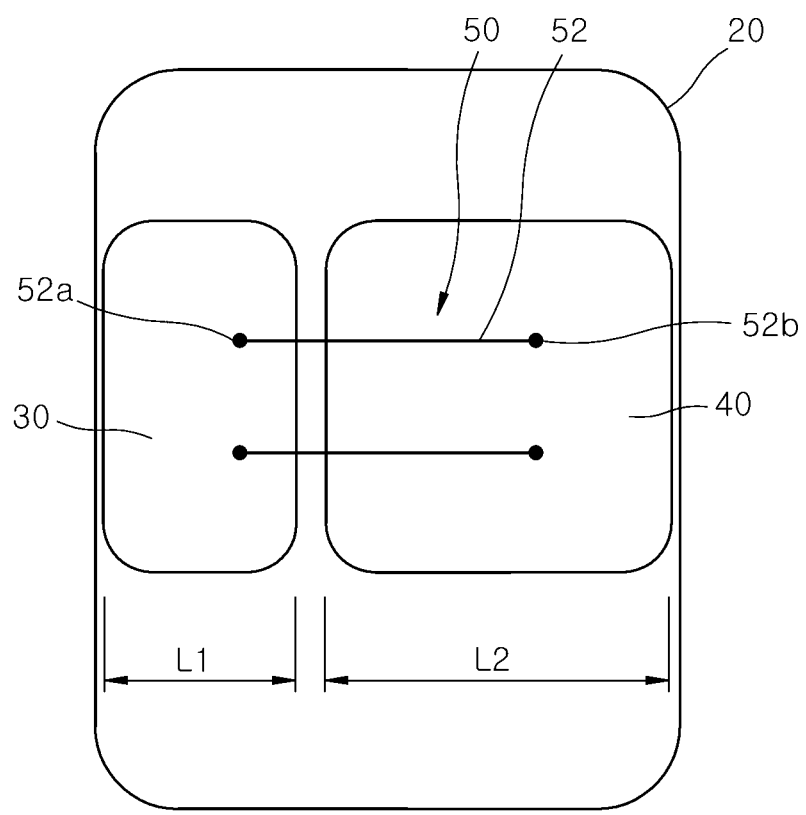
FIG. 3 is a rear view illustrating another example of the connection tether in the airbag apparatus in accordance with the first embodiment of the present invention.

FIG. 3 is a rear view illustrating another example of the connection tether in the airbag apparatus in accordance with the first embodiment of the present invention.

Referring to FIG. 3, the connection tether 50 may include one or more linear tethers 52 connecting the second and third chambers 30 and 40 to each other. The linear tether 52 may indicate a string-type or band-type tether formed in an elongated shape. The number of linear tethers 52 may be appropriately designed depending on the height of the second and third chambers 30 and 40 or the size of the vehicle.

One side of the linear tether 52 may be connected to the second chamber 30 by a first sewed part 52a, and the other side of the linear tether 52 may be connected to the third chamber 40 by a second sewed part 52b. The first sewed part 52a of the linear tether 52 may be positioned eccentrically toward the third chamber 40 based on the center of the second chamber 30, and the second sewed part 52b of the linear tether 52 may be positioned eccentrically away from the second chamber 30 based on the center of the third chamber 40. Since the other side of the linear tether 52 is eccentrically positioned away from the second chamber 30 based on the center of the third chamber 40, the support force of the third chamber 40 to support the linear tether 52 can be increased when the second or third chamber 30 or 40 is pressurized by the head H.

Figure 4:
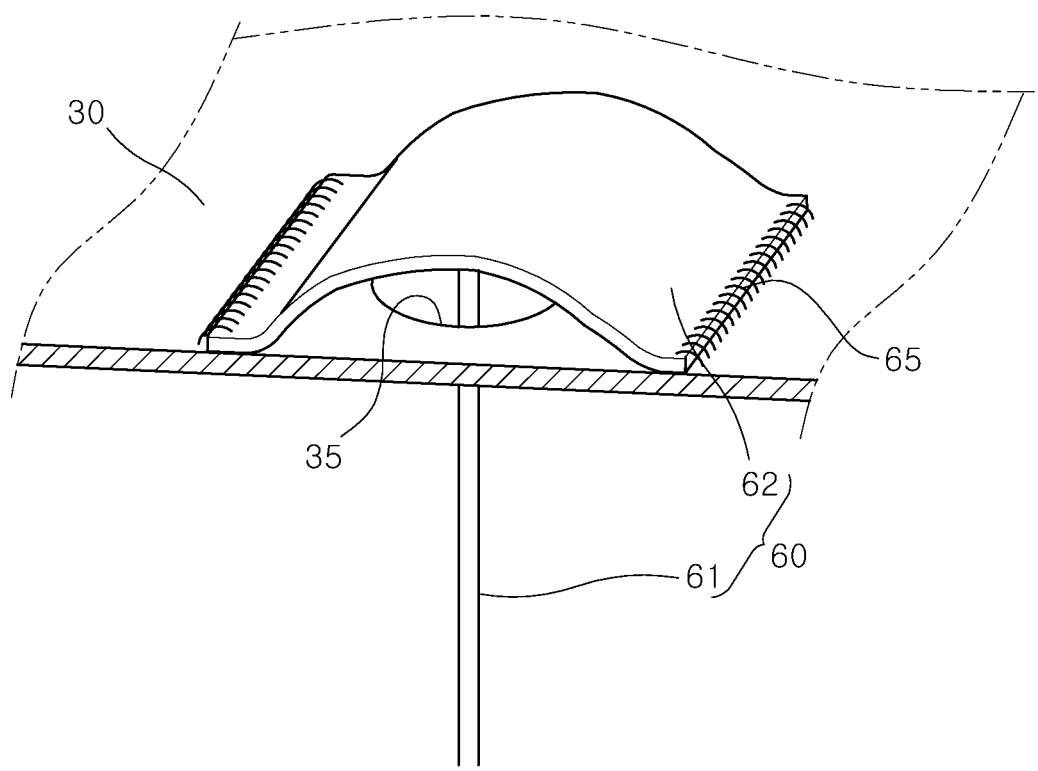
FIG. 4 is a perspective view illustrating a shut-off valve in the airbag apparatus in accordance with the embodiment of the present invention.

FIG. 4 is a perspective view illustrating a shut-off valve in the airbag apparatus in accordance with the embodiment of the present invention.

Referring to FIG. 4, when the first chamber 20 is completely deployed, the shut-off valve 60 may close the first passage 35 to block gas of the second chamber 30 from being discharged to the first chamber 20 through the first passage 35. Since the shut-off valve 60 closes the first passage 35 of the second chamber 30 when the first chamber 20 is completely deployed, the shut-off valve 60 can prevent the gas of the second chamber 30 from being discharged to the first chamber 20. Therefore, since a reduction in expansion force (supporting force) of the second chamber 30 can be prevented, it is possible to increase the supporting force of the second chamber 30 for the head in case of an oblique collision of the vehicle.

The shut-off valve 60 may include a valve tether 61 and a valve cover 62.

The valve tether 61 may be fixed to the first chamber 20, and installed through the first passage 35. One side of the valve tether 61 may be connected to the front of the first chamber 20, and the other side of the valve tether 61 may be connected to the valve cover 62 disposed around the first passage 35. The length of the valve tether 61 may be slightly shorter than the maximum deployment height of the first chamber 20. Therefore, when the first chamber 20 is completely deployed, the valve tether 61 may apply a tensile force to the valve cover 62.

The valve cover 62 may be connected to the valve tether 61. When the first chamber 20 is completely deployed, the valve cover 62 may be pulled by the valve tether 61, and close the first passage 35. The valve cover 62 may be formed in various shapes as long as the valve cover 62 can close the first passage 35. Since the valve cover 62 is pulled by the valve tether 61 and closes the first passage 35 when the first chamber 20 is completely deployed, the valve cover 62 can prevent a discharge of gas from the second chamber 30.

When the first chamber 20 is completely deployed, the valve tether 61 may be disposed in parallel to the front-to-rear direction of the vehicle in the first passage 35. Therefore, since the valve cover 62 is pressed against the entire circumference of the first passage 35, the gas blocking performance of the valve cover 62 can be improved.

A part of the circumference of the valve cover 62 may be fixed to the circumference of the first passage 35 by a valve sewing part 65. For example, the left and right sides of the valve cover 62 may be fixed to the circumference of the first passage 35 by the valve sewing part 65, and the top and bottom sides of the valve cover 62 may not be fixed to the circumference of the first passage 35. Since the valve cover 62 is partially fixed by the valve sewing part 65, the valve cover 62 can be prevented from being separated from the first passage 35, even though the valve cover 62 is pulled by the valve tether 61. Then, gas may be introduced into the second chamber 30 through portions where the valve sewing part 65 is not formed at the circumference of the valve tether 61.

The operation of the airbag apparatus in accordance with the embodiment of the present invention will be described. Hereafter, the operations of the airbag apparatus in case of an oblique collision and head-on collision of the vehicle will be sequentially described.

First, the operation of the airbag apparatus in case of an oblique collision of the vehicle will be described.

Figure 5:
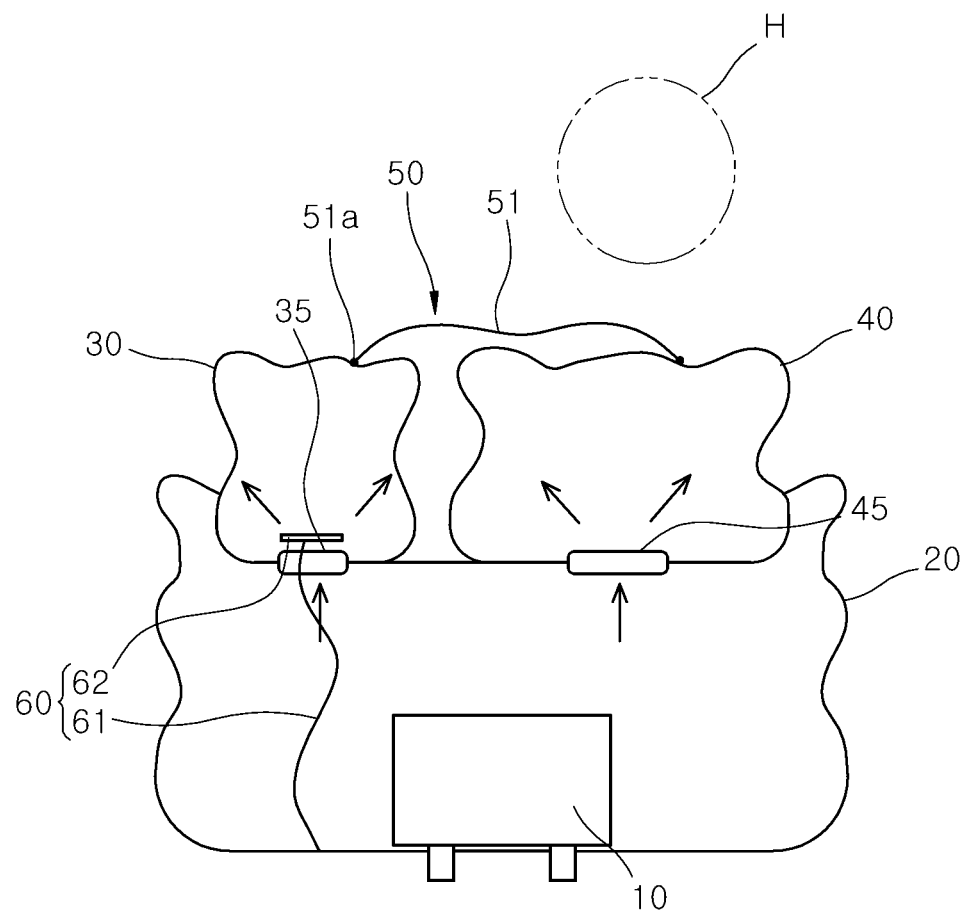
FIG. 5 is a plan view illustrating that the airbag apparatus in accordance with the embodiment of the present invention is deployed.
Figure 6:
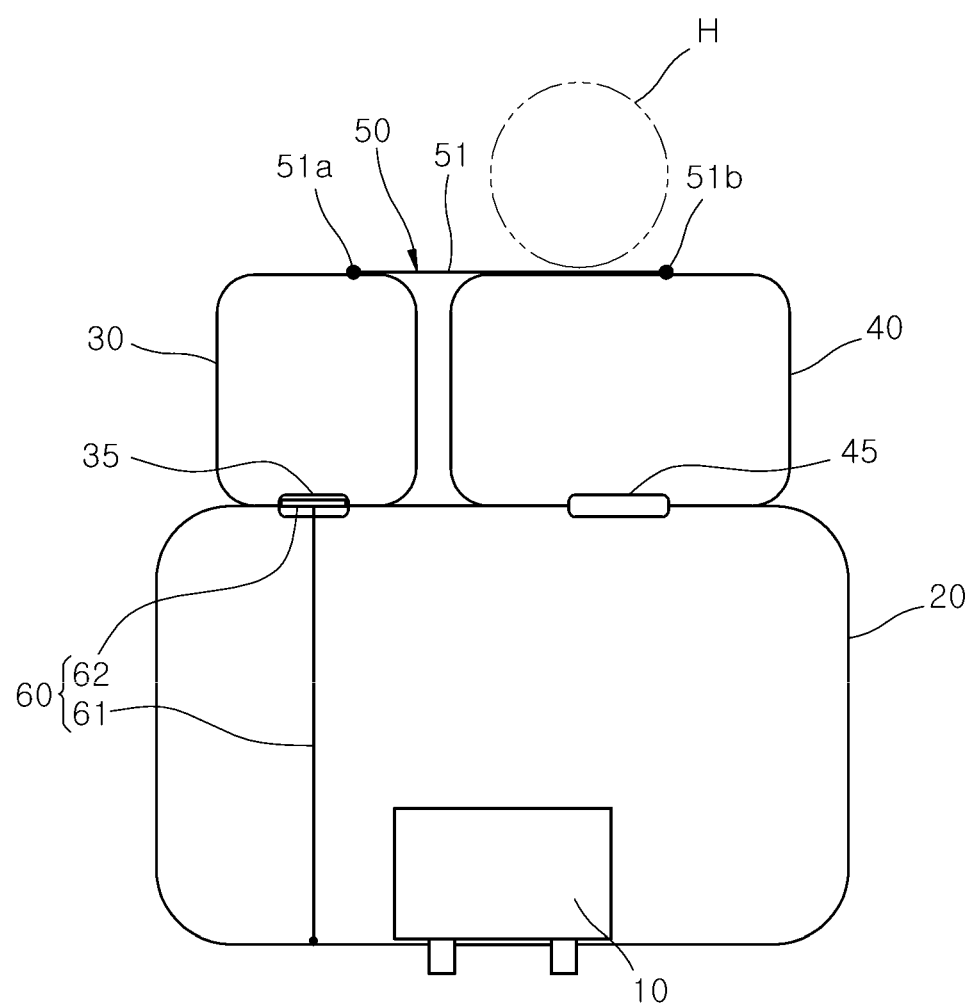
FIG. 6 is a cross-sectional view illustrating that the shut-off valve is opened in the airbag apparatus in accordance with the embodiment of the present invention.
Figure 7:
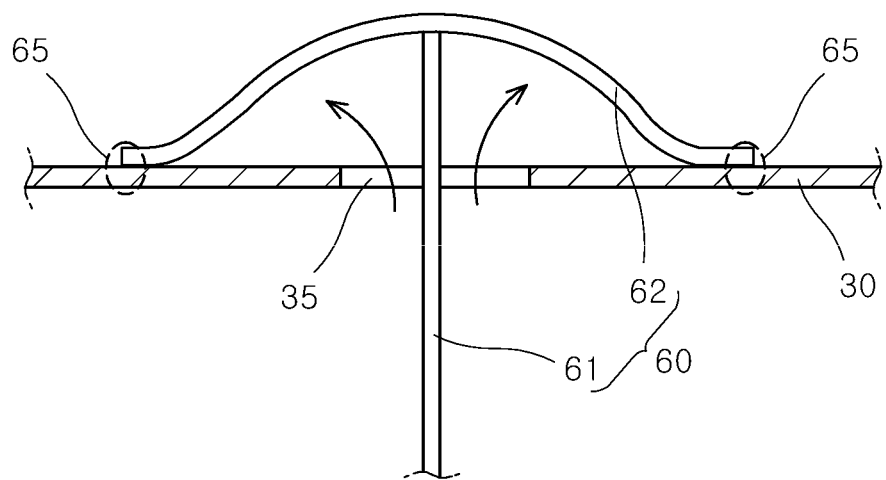
FIG. 7 is a plan view illustrating that the airbag apparatus in accordance with the embodiment of the present invention is completely deployed.
Figure 8:
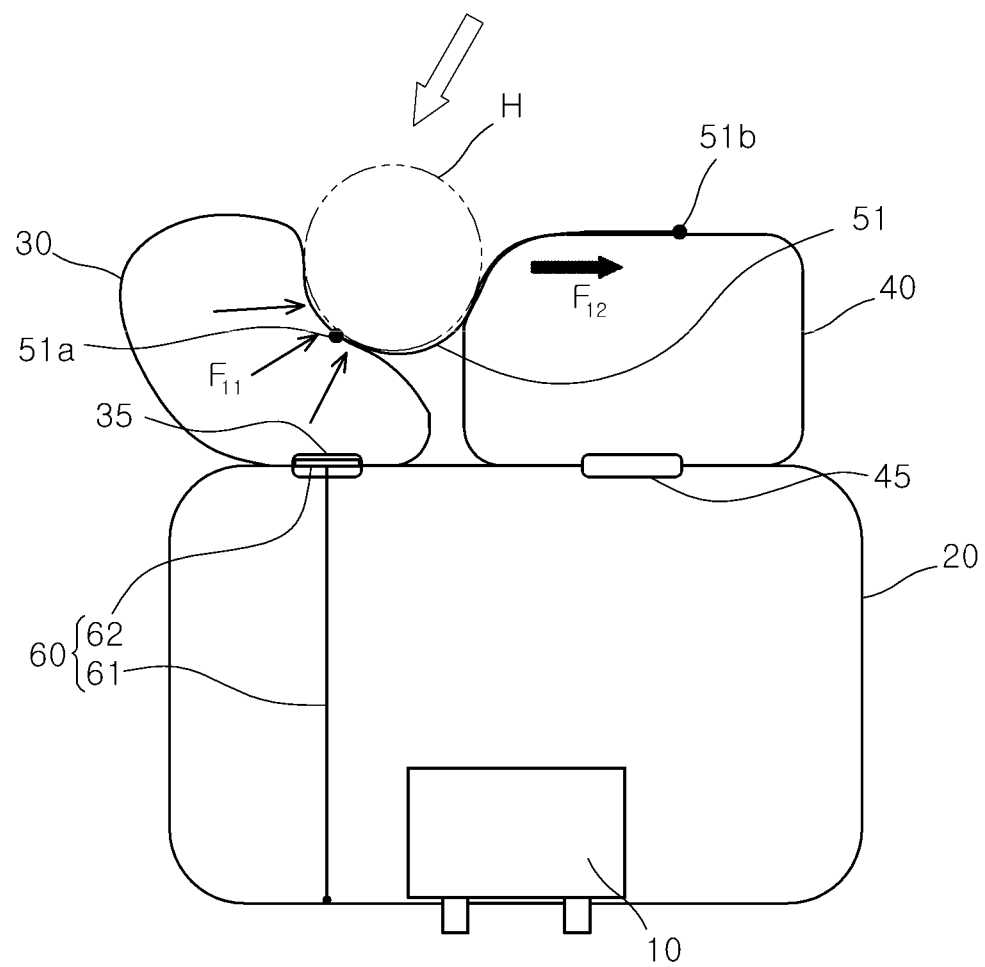
FIG. 8 is a cross-sectional view illustrating that the shut-off valve closes a first passage in the airbag apparatus in accordance with the embodiment of the present invention.
Figure 9:
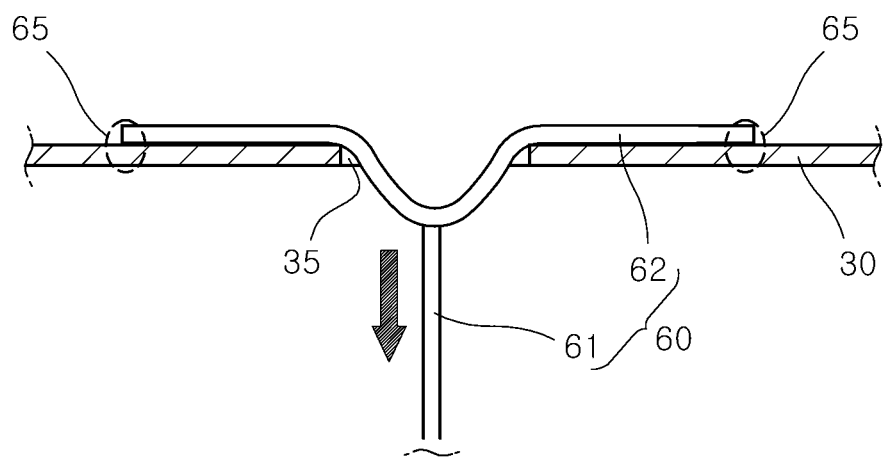
FIG. 9 is a plan view illustrating that the head of a passenger is buffered by the connection tether and a second chamber in the airbag apparatus in accordance with the embodiment of the present invention, in case of an oblique collision of a vehicle.

FIG. 5 is a plan view illustrating that the airbag apparatus in accordance with the embodiment of the present invention is deployed, FIG. 6 is a cross-sectional view illustrating that the shut-off valve is opened in the airbag apparatus in accordance with the embodiment of the present invention, FIG. 7 is a plan view illustrating that the airbag apparatus in accordance with the embodiment of the present invention is completely deployed, FIG. 8 is a cross-sectional view illustrating that the shut-off valve closes the first passage in the airbag apparatus in accordance with the embodiment of the present invention, and FIG. 9 is a plan view illustrating that the head of a passenger is buffered by the connection tether and the second chamber in the airbag apparatus in accordance with the embodiment of the present invention, in case of an oblique collision of a vehicle.

Referring to FIGS. 5 to 9, gas generated from the inflator 10 may be injected into the first chamber 20 in case of an oblique collision of the vehicle. The first chamber 20 may be deployed while being expanded toward the rear of the vehicle. The gas of the first chamber 20 may be introduced to the second chamber 30 through the first passage 35, and introduced to the third chamber 40 through the second passage 45.

At this time, while the first chamber 20 is deployed, the rear of the first chamber 20 and the valve cover 62 may be moved toward the rear of the vehicle. Before the first chamber 20 is completely deployed, the valve cover 62 may be separated from the first passage 35 by the pressure of gas passing through the first passage 35 (refer to FIG. 6).

When the first chamber 20 is completely deployed, the valve cover 62 may be separated from the front of the first chamber 20. Thus, the valve cover 62 may tightly stretch the valve tether 61 toward the rear of the vehicle, and the valve tether 61 may pull the valve cover 62 to the front of the vehicle using a tensile force. At this time, since the valve cover 62 is pressed against the circumference of the first passage 35 and blocks the first passage 35, the gas of the second chamber 30 can be prevented from being discharged to the first chamber 20 (refer to FIG. 8). Therefore, a reduction in expansion force or supporting force of the second chamber 30 can be prevented.

When the head H is moved to the front by the oblique collision of the vehicle, the head H may be obliquely moved to the front of the vehicle. As the head H is obliquely moved to the front, the head H may be inserted and held between the second and third chambers 30 and 40. Therefore, the second and third chambers 30 and 40 may be pressed against the head H and prevent a turn of the head H, which makes it possible to reduce the time required for holding the head H.

Since a turn of the head H is prevented in case of the oblique collision of the vehicle, an injury of the head H or neck can be prevented. Furthermore, when the head H is moved obliquely in the direction of the oblique collision of the vehicle, the connection tether 50 may pull the second chamber 30 toward the third chamber 40 using a supporting force F12 of the third chamber 40. Therefore, the connection tether 50 can prevent the head H from being separated from the second chamber 30.

In case of the oblique collision of the vehicle, the load of the head H may be first absorbed by the tensile force F12 of the connection tether 50, and then absorbed by a buffering force F11 of the second chamber 30. At this time, the connection tether 50 may primarily absorb the load of the head H through a pulling force of the third chamber 40, and the second chamber 30 may be transformed by the load of the head H and secondarily absorb the shock of the head H. The load of the head H, transferred to the second chamber 30, may be transferred to the first chamber 20 and thus tertiarily absorbed.

Next, the operation of the airbag apparatus in case of a head-on collision of the vehicle will be described.

Figure 10:
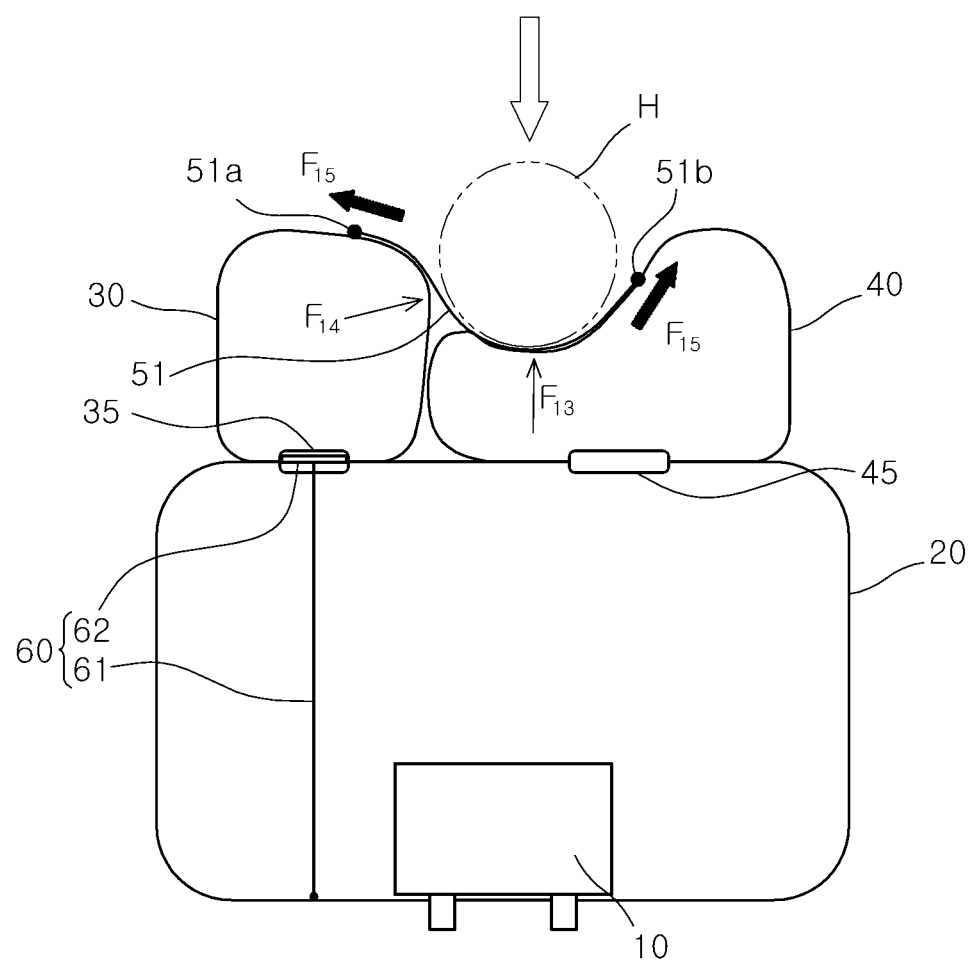
FIG. 10 is a plan view illustrating that the head is buffered by the connection tether and a third chamber in the airbag apparatus in accordance with the second embodiment of the present invention, in case of a head-on collision of the vehicle.

FIG. 10 is a plan view illustrating that the head of a passenger is buffered by the connection tether and the third chamber in the airbag apparatus in accordance with the second embodiment of the present invention, in case of a head-on collision of the vehicle.

Referring to FIG. 10, the third chamber 40 may be disposed in front of the head H because the widthwise length L2 of the third chamber 40 is larger than the widthwise length L1 of the second chamber 30. Therefore, the head H may be moved to the third chamber 40 in case of a head-on collision of the vehicle.

As the third chamber 40 is transformed by the load of the head H, both sides of the connection tether 50 may be pulled by the second and third chambers 30 and 40. Therefore, the load of the head H may be primarily absorbed by tensile forces F14 and F15 of the connection tether 50, and secondarily absorbed by the buffering force F13 of the third chamber 40. The pressure applied to the third chamber 40 may be transferred to the first chamber 20 and thus tertiarily absorbed.

In accordance with the embodiments of the present invention, when the first chamber is completely deployed, the shut-off valve can close the first passage, and thus prevent gas of the second chamber from being discharged to the first chamber through the first passage. Therefore, it is possible to prevent a reduction in supporting force of the second chamber, caused by a reduction in expansion pressure of the second chamber.

Furthermore, since the head of a passenger is inserted and held between the second and third chambers in case of an oblique collision of the vehicle, a turn of the head can be prevented by the holding forces of the second and third chambers, and the time required for holding the head can be reduced, which makes it possible to prevent an injury of the head or neck.

Furthermore, when the head is obliquely moved in the direction of the oblique collision of the vehicle, the connection tether can pull the second changer toward the third chamber using the supporting force of the third chamber, which makes it possible to prevent the head from separating from the second chamber.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An airbag apparatus comprising:
    a first chamber connected to an inflator;
    a second chamber connected to the rear of the first chamber so as to be supported by the first chamber and having a first passage through which gas of the first chamber is introduced, the second chamber being configured to support the head of a passenger in case of an oblique collision of a vehicle;
    a third chamber connected to the rear of the first chamber so as to be supported by the first chamber, the third chamber being disposed at one side of the second chamber and configured to support the head of the passenger in case of a head-on collision of the vehicle;
    a connection tether connecting the second and third chambers so as to limit a separation distance between the second and third chambers; and
    a shut-off valve configured to close the first passage to block discharge of gas from the second chamber to the first chamber through the first passage in response to complete deployment of the first chamber,
    wherein:
    the connection tether is disposed at the rear of the second chamber and the rear of the third chamber;
    one side of the tether is connected to the second chamber by a first sewed part, and the other side of the surface tether is connected to the third chamber by a second sewed part; and
    the first sewed part is positioned eccentrically toward the third chamber based on the center of the second chamber, and the second sewed part is positioned eccentrically away from the second chamber based on the center of the third chamber.

2. The airbag apparatus of claim 1, wherein the shut-off valve comprises:
    a valve tether fixed to the first chamber, and passing through the first passage; and
    a valve cover connected to the valve tether, and configured to be pulled by the valve tether so as to close the first passage in response to complete deployment of the first chamber.

3. The airbag apparatus of claim 2, wherein, in response to complete deployment of the first chamber, the valve tether is disposed in parallel to the front-to-rear direction of the vehicle in the first passage.

4. The airbag apparatus of claim 2, wherein a part of the edge of the valve cover is fixed to the circumference of the first passage by a valve sewing part.

5. The airbag apparatus of claim 1, wherein the third chamber has a greater widthwise length than the second chamber.

6. The airbag apparatus of claim 5, wherein the third chamber is formed to have the same height as the second chamber.

7. The airbag apparatus of claim 1, wherein the connection tether comprises a surface tether which covers a part of one surface of the second chamber at the rear thereof and a part of one surface of the third chamber at the rear thereof.

8. The airbag apparatus of claim 7, wherein the surface tether has a width in a range of ⅓ to ⅔ of the height of the second or third chamber.

9. The airbag apparatus of claim 1, wherein the connection tether comprises at least one linear tether connecting the second chamber and the third chamber.

* * * * *